US012356050B2

(12) United States Patent
Huang et al.

(10) Patent No.: US 12,356,050 B2
(45) Date of Patent: Jul. 8, 2025

(54) SYSTEM AND METHODS FOR CHANGING A SIZE OF A GROUP OF USERS TO BE PRESENTED WITH A MEDIA ITEM

(71) Applicant: GOOGLE LLC, Mountain View, CA (US)

(72) Inventors: Wei Huang, Kirkland, WA (US); Fabio Soldo, Los Altos, CA (US); Tianyi Pan, Santa Clara, CA (US); Matthew Leach, Mountain View, CA (US)

(73) Assignee: Google LLC, Mountain View, CA (US)

( * ) Notice: Subject to any disclaimer, the term of this patent is extended or adjusted under 35 U.S.C. 154(b) by 0 days.

(21) Appl. No.: 17/778,371

(22) PCT Filed: Nov. 19, 2019

(86) PCT No.: PCT/US2019/062297
§ 371 (c)(1),
(2) Date: May 19, 2022

(87) PCT Pub. No.: WO2021/101529
PCT Pub. Date: May 27, 2021

(65) Prior Publication Data
US 2023/0023973 A1  Jan. 26, 2023

(51) Int. Cl.
*H04N 21/61* (2011.01)
*G06F 3/04847* (2022.01)
*H04N 21/258* (2011.01)

(52) U.S. Cl.
CPC ..... *H04N 21/6106* (2013.01); *G06F 3/04847* (2013.01); *H04N 21/25891* (2013.01)

(58) Field of Classification Search
CPC ......... H04N 21/2393; H04N 21/23439; H04N 21/274; H04N 21/2668; H04N 21/25883; H04N 21/23109; H04N 21/44224
See application file for complete search history.

(56) References Cited

U.S. PATENT DOCUMENTS 10,068,257 B1 * 9/2018 Mosthaf ............. G06Q 30/0203
2002/0087980 A1 * 7/2002 Eldering ............. H04N 21/262
348/E7.071

(Continued)

FOREIGN PATENT DOCUMENTS

JP   2003-032660 A   1/2003
JP   2007-201742 A   8/2007

(Continued)

OTHER PUBLICATIONS

International Search Report and Written Opinion of International Application No. PCT/US2019/62297 mailed Aug. 17, 2020.

(Continued)

*Primary Examiner* — Jason Salce
(74) *Attorney, Agent, or Firm* — Lowenstein Sandler LLP

(57) ABSTRACT

A system and method are disclosed for identifying a media item to be provided to a group of users of a content sharing platform, wherein the media item is associated with a category, and wherein each user in the group of users is associated with a weight indicating a probability of a correspondence between a respective user and the category associated with the media item, receiving a request to change a size of the group of users from a first level to a second level, the first level corresponding to a first weight threshold for the group of users, and calculating, based a value indicating a difference between the first level and the (Continued)

second level, a second weight threshold for the group of users corresponding to the second level, the second weight threshold to be subsequently used to determine whether the media item is to be provided to a user requesting content from the content sharing platform.

20 Claims, 6 Drawing Sheets

(56) References Cited

U.S. PATENT DOCUMENTS

| | | | | |
|---|---|---|---|---|
| 2007/0204011 | A1* | 8/2007 | Shaver | H04N 21/6543 |
| | | | | 709/219 |
| 2008/0082920 | A1* | 4/2008 | Eom | G06F 3/04886 |
| | | | | 715/702 |
| 2009/0138805 | A1* | 5/2009 | Hildreth | H04N 21/4755 |
| | | | | 715/745 |
| 2013/0279881 | A1* | 10/2013 | Lu | H04N 5/91 |
| | | | | 386/E9.011 |
| 2014/0282800 | A1* | 9/2014 | Morita | H04N 21/440263 |
| | | | | 725/119 |
| 2015/0081783 | A1 | 3/2015 | Gong et al. | |
| 2016/0117736 | A1 | 4/2016 | Dasdan et al. | |
| 2016/0232575 | A1 | 8/2016 | Kirti et al. | |
| 2018/0144056 | A1 | 5/2018 | Paritosh | |
| 2018/0356961 | A1 | 12/2018 | Lewis et al. | |
| 2020/0183545 | A1* | 6/2020 | Kitson | H04L 65/612 |
| 2023/0020043 | A1* | 1/2023 | Zink | G06Q 30/0244 |

FOREIGN PATENT DOCUMENTS

| | | |
|---|---|---|
| JP | 2011-003155 A | 1/2011 |
| JP | 2012-043193 A | 3/2012 |
| JP | 2013-092912 A | 5/2013 |
| JP | 2014-006568 A | 1/2014 |
| JP | 2015079448 A | 4/2015 |
| JP | 2017107599 A | 6/2017 |
| WO | 2014103112 A1 | 7/2014 |
| WO | 2014185888 A1 | 11/2014 |
| WO | 2018037592 A1 | 3/2018 |

OTHER PUBLICATIONS

Japanese Patent Application No. 19829360.7 Office Action dated Jul. 10, 2023, 5 pages.
Office Action for Korean Patent Application No. 10-2022-7014285, mailed Apr. 29, 2024, 12 Pages.
Office Action for Chinese Patent Application No. 201980100971.4, mailed Dec. 10, 2024, 25 Pages.

* cited by examiner

SYSTEM AND METHODS FOR CHANGING A SIZE OF A GROUP OF USERS TO BE PRESENTED WITH A MEDIA ITEM

TECHNICAL FIELD

Aspects and implementations of the present disclosure relate to changing a size of a group of users to be presented with a media item from an initial level to a different level in response to receiving a request from a provider of the media item.

BACKGROUND

A provider of a media item frequently selects an appropriate group of users that may be interested in a media item. The media item provider may want to change a size of the group of users to include additional users or limit the users that may be presented with the media item. The media item provider may not easily identify users to include or exclude from the group of users that may be interested in the media item.

SUMMARY

The below summary is a simplified summary of the disclosure in order to provide a basic understanding of some aspects of the disclosure. This summary is not an extensive overview of the disclosure. It is intended neither to identify key or critical elements of the disclosure, nor delineate any scope of the particular implementations of the disclosure or any scope of the claims. Its sole purpose is to present some concepts of the disclosure in a simplified form as a prelude to the more detailed description that is presented later.

In some implementations, a system and method are disclosed for changing a size of a group of users to be provided with a media item from a first level to a second level in response to receiving a request from a provider of the media item. In an implementation, a media item is identified to be presented to a group of users of a content sharing platform. The media item is associated with a category. Each user of the group of users is associated with a weight indicating a probability of a correspondence between a respective users and the category associated with the media item. A request to change a size of the group of users from a first level to a second level is received. The first level corresponds to a first weight threshold for the group of users. A second weight threshold for the group of users is calculated based a value indicating a difference between the first level and the second level. The second weight threshold is to be used or subsequently used to determine whether the media item is to be provided to a user requesting content from the content sharing platform.

Optionally, the first level may represent a first statistical value that may indicates a first quantitative relation between a number of users in the group and a total number of users of the content sharing platform. Optionally, the second level may represent a second statistical value that indicates a second quantitative relation between a number of users in the group and the total number of users of the content sharing platform. Optionally, the value indicating the difference between the first level and the second level may be specified or specifiable by a provider of the media item and may be a difference between the first statistical value and the second statistical value. The method may optionally further comprise, or system may optionally be configured for, determining the value indicating the difference between the first level and the second level. The determining of the value may optionally comprise receiving input of a provider of the media item, the received input specifying the second level. The determining of the value may optionally comprise identifying one or more rules pertaining to the category associated with the media item. The determining of the value may optionally comprise determining, based on the one or more rules, the second statistical value. The determining of the value may optionally comprise determining a difference between the first statistical value and the second statistical value. The method may optionally further comprise, or system may optionally be configured for, comparing a weight associated with the requesting user for the category of the media item with the second threshold to determine whether the media item is to be provided to the requesting user. Optionally, the request to change the size of the group of users may be received in response to a provider of the media item interacting with a slider component of a user interface, wherein the slider component may allow the provider of the media item to select the second level for the size of the group of users. Optionally, the category may comprise at least one of: a parental status of the user, an occupation of the user, an industry associated with the occupation of the user, a size of a company that employs the user, an education status of the user, a relationship status of the user, or a property ownership status of the user. Optionally, the provision of the media item may comprise one or more of: allowing access to the media item, transmitting the media item and/or presenting or permitting presentation of the media item.

In some implementations, a system and method are disclosed for providing a user interface (UI) to allow a first user to change a size of a group of second users to be provided with a media item from a first level to a second level. In an implementation, a UI is provided to a first user of a content sharing platform. The UI includes at least a first portion and a second portion. The first portion includes one or more first UI components that allow the first user to provide one or more categories associated with a media item. The second portion includes one or more second UI components that allow the first user to change a size of a group of second users to be provided with the media item. A first request to associate a first category with the media item may be received. The one or more first UI components may be operable by the first user to provide the first request. The first request may be received responsive to the first user interacting with the one or more first UI components. A second request to change the size of the group of second users to be provided with the media item from a first level to a second level may be received. The one or more second UI components may be operable by the first user to provide the second request. The second request may be received responsive to the first user interacting with the one or more second UI components. In response to receiving the first request and the second request, an indication of an estimated change in the size of the group of second users from the first level to the second level is provided in the UI.

The system may comprise a memory component; and a processor communicatively coupled to the memory component. The processor may be configured to implement the UI.

Optionally, the one or more first UI components may be configured to display, via the UI, one or more categories to be selected by the first user for association with the media item. Optionally, the one or more second UI components may comprise a plurality of level markers and a slider component. Optionally, a first level marker may correspond to the first level and a second level marker may correspond to the second level. Optionally, the slider component may be operable to change the size of the group of second users. Optionally, the first user may request to change the size of the group of second users from the first level to the second level by moving the slider component from the first level marker to the second level marker. Optionally, the second level marker may comprise a value indicating a difference between the first level and the second level. Optionally, the indication of the estimated change in the size of the group of second users may include a number of second users added or removed from the group of second users as a result of changing the size of the group of second users from the first level to the second level. Optionally, the category may comprise at least one of: a parental status of the user, an occupation of the user, an industry associated with the occupation of the user, a size of a company that employs the user, an education status of the user, a relationship status of the user, or a property ownership status of the user.

In an implementation, is a computer program product comprising instructions that, when the computer program is executed by a processing device, causes the processing device to perform any of the above methods. The computer program product may be comprised in a non-transitory computer readable storage medium.

The instructions may cause the processing device to identify a media item to be provided to a group of users of a content sharing platform, wherein the media item is associated with a category, and wherein each user in the group of users is associated with a weight indicating a probability of a correspondence between a respective user and the category associated with the media item; receive a request to change a size of the group of users from a first level to a second level, the first level corresponding to a first weight threshold for the group of users; and calculate, based a value indicating a difference between the first level and the second level, a second weight threshold for the group of users corresponding to the second level, the second weight threshold to be subsequently used to determine whether the media item is to be provided to a user requesting content from the content sharing platform.

BRIEF DESCRIPTION OF THE DRAWINGS

Aspects and implementations of the present disclosure will be understood more fully from the detailed description given below and from the accompanying drawings of various aspects and implementations of the disclosure, which, however, should not be taken to limit the disclosure to the specific aspects or implementations, but are for explanation and understanding only.

DETAILED DESCRIPTION

Figure 1:
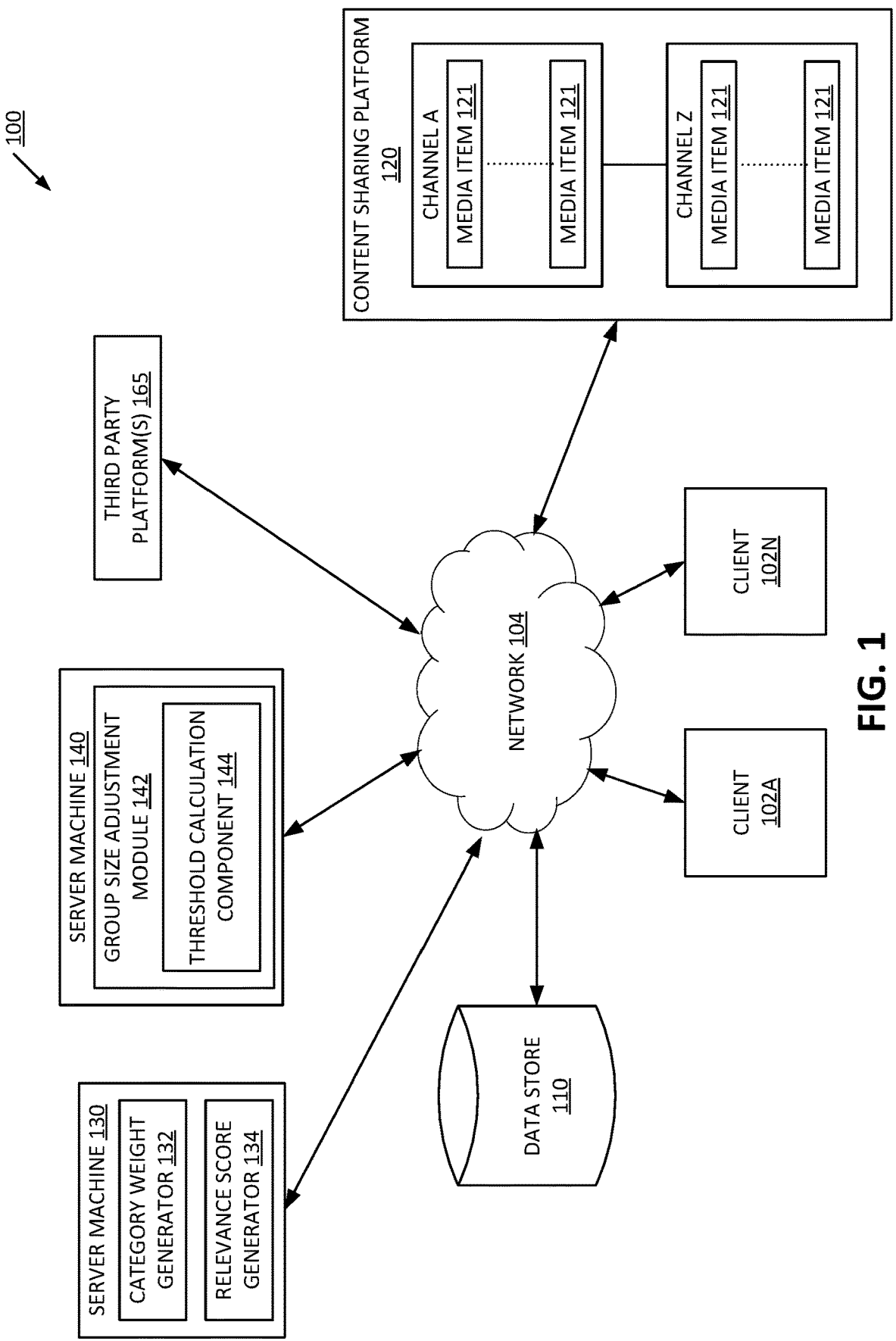
FIG. 1 illustrates an example system architecture, in accordance with implementations of the present disclosure.

Aspects of the present disclosure are directed to changing a size of a group of users to be provided with a media item from an initial level to a different level in response to receiving a request from a provider of the media item. Selecting an appropriate group of users that may be interested in a media item (e.g., a video clip, an audio clip, etc.) can be overwhelming for a provider of the media item. A media item provider may want a media item of a content sharing platform to be provided to a target group of users associated with a first category (e.g., parents of young infants). A user may be identified to be included in the group of users based on one or more attributes (e.g., weights) included in a user profile associated with the user. There may be a small percentage of users of the content sharing platform that are included in the group of users associated with the first category. As such, the media item provider may want to expand the group of users to include users that were not originally considered as belonging to the first category, but may still be interested in media items related to the first category.

Existing mechanisms that are available to media item providers often result in selecting an overly broad group of users or alternatively not reaching enough users. In some conventional systems, media item providers may identify one or more additional categories to be associated with the media item in order to increase the number of users included in the group of users. However, by associating the additional categories with the media item, more users may be included in the group of users than anticipated by the media item provider. As a result, the media item may be provided to users of the content sharing platform even though the media item may not be relevant to these users.

One possible option for implementing this may include, in response to receiving a request for content from a user of the content sharing platform, one or more attributes of a user profile may be added or changed based on one or more pre-defined expansion rules to determine whether the user should be included in the group of users, and therefore can be provided with the media item. However, unnecessary processing resources are typically utilized to add or change the one or more attributes in response to the content request, thereby increasing system latency when responding to the content request.

Implementations of the present disclosure address the above and other deficiencies by simplifying the user group selection process and allowing a media item provider to explicitly define desired user categories in a group of users to whom the media item can be provided and a desired size of such a group. The size of the group can be dynamically adjusted (e.g., expanded or contracted) according to the media item provider's preference. In particular, aspects of the present disclosure may provide for changing the size of a group of users to be provided with a media item from an initial (first) level to a different (second) level in response to a request from a provider of the media item.

In some implementations, a media item provider may upload or otherwise provide a media item to a content sharing platform for presentation to one or more users of the content sharing platform. The media item provider may specify a category of a group of users to be provided with the media item. For example, the media item provider may indicate the media item should be presented to parents of infants. In another example, the media item provider may indicate the media item is to be provided to homeowners. The media item provider may also indicate a desired size of the group of users to be provided with the media item associated with the specific category. Initially, the size of the group of users for the specific category may be set to a first level.

A first level may be represented as a first statistical value that indicates a first quantitative relation between the number of users that belong to the specific category and the entire population of users (e.g., the total number of users of the content sharing platform). The first statistical value may be an estimated percentage of a population of users, from the entire population of users of the content sharing platform, that belong to the specific category. For example, a specific category associated with a media item may be parents of infants, and users that belong to this category may correspond to 10% of the entire population of users of the content sharing platform. As such, the first level may be represented by a first statistical value of 10% for the specific category of parents of infants.

A user of the content sharing platform may be associated with one or more weights each indicating a probability of the user belonging to a respective category. In some implementations, a machine learning model trained on historical data (e.g., training inputs including attributes of users and target outputs including categories previously assigned to users) may be used to produce one or more weights for individual users of the content sharing platform, where each weight indicates a probability of a correspondence between the user and a specific category. For example, the trained machine learning model may produce weights 0.85 and 0.5 for user A, where weight 0.85 indicates that the probability of user A belonging to the category of parents of infants is 85% and the probability of user A belonging to the category of parents of toddlers is 50%. The content sharing platform may store weights of individual users in a data store in association with respective categories. The content sharing platform may also set weight thresholds for each category or an overall weight threshold for all categories. A weight threshold may be used to determine whether to include a user in a group of users to whom a media item associated with a particular category can be provided. This may be achieved by comparing a corresponding weight of the user with a weight threshold associated with the relevant category. If the corresponding weight meets or exceeds the weight threshold associated with the relevant category, the user may be considered to belong to that category and may be included in the group of users to whom the media item can be provided. In other words, the user may be considered to be part of an appropriate audience for the media item. If the corresponding weight does not meet or exceed the weight threshold associated with the relevant category, then the user may (at least for the current determination) be considered to not belong to that category and the media item may not be provided.

Depending on the weight threshold associated with a specific category, the size of the group of users (or the size of the appropriate audience) to be provided with a media item of the specific category would vary. For example, if a first weight threshold is set to 0.9 and a second weight threshold is set to 0.8, then the number of users having respective weights that meet or exceed the first threshold would be lower than the number of users having respective weights that meet or exceed the second threshold.

According to some aspects of the present disclosure, for a specific category, the user group size at the first (initial) level is associated with a first (initial) weight threshold, which can be user defined or determined by the content sharing platform (e.g., by selecting a threshold that is likely to produce a percentage of user population that matches the first level for the specific category). In accordance with the previous examples, the first level may be represented by 10% (i.e., 10% of the entire population of users of the content sharing platform may be estimated to be parents of infants). A weight threshold that can result in 10% of users to be considered as parents of infants may be set to 85%. In some implementations, the content sharing platform determines the weight threshold by (i) identifying users Ux with weight w associated with the category of parents of infants, (ii) determining number n of users that constitutes 10% of the total population of users of the content sharing platform, (iii) selecting a cutoff value t, which, when compared with weight w of each user Ux, would result in n number of users Ux having weight w that exceeds (or is equal to) cutoff value t, and (iv) setting the first threshold to t.

As discussed above, a media item provider may request that the size of the group of users to be provided with a media item be changed from the first level to a second level. The second level may represent a second statistical value that indicates a second quantitative relation between a number of users in the group and the total number of users of the content sharing platform. The second level may correspond with a population of users that is expanded or contracted from the original population of users of the first level. For example, the media item provider may request that the size of the group of users to be provided with the media item be doubled (i.e., increased by 100%).

In some implementations, the media item provider may specify the value (e.g., 100%) indicating the difference between the first level and the second level. Alternatively, the media item provider may merely specify a particular level that should result from the change (e.g., by setting the new level from level 1 to level 2), and the content sharing platform may determine a second statistical value that indicates a second quantitative relation between a number of users in the group and an entire population of users. The value indicating the difference between the first level and the second level may be determined in view of a difference between the first statistical value and the second statistical value.

The size of the group at the second level may be determined based on a population of users of the content sharing platform that satisfy a second weight threshold for the group of users, where the second weight threshold corresponds to the second level. The second weight threshold may be calculated based on the value indicating the difference between the first level and the second level. In accordance with the previous examples, the second level may correspond with a population of users that is expanded approximately by 100% from the original population of users that belong to the specific category of parents of infants (i.e., 10% of the entire population of users), and the requested increase by 100% would result in 20% of users to be considered as belonging to the specific category of parents of infants (i.e., from the original 10% of the entire population of users). In some implementations, the content sharing platform calculates the second weight threshold by (i) identifying users Ux with weight w associated with the category of parents of infants, (ii) determining number m of users that constitutes 20% (statistical value of the second level) of the total population of users of the content sharing platform, (iii)

selecting a cutoff value t2, which when compared with weight w of each user Ux, would result in m number of users Ux having weight w that exceeds (or is equal to) cutoff value t2, and (iv) setting the second threshold to t2. In response to determining that the weight assigned to User A satisfies the second weight threshold for the category of parents of infants (i.e., 0.7), User A may be determined to be included in the population of users corresponding to the category of parents of infants, even though User A would not satisfy the first weight threshold.

In some implementations, a relevance score may be generated and included in a user profile of a user. The relevance score may correspond to a weight associated with a category included in the user profile. The relevance score may be generated based on a determination of whether a user's weight satisfies the first weight threshold and/or the second weight threshold, with respect to the category. For example, in response to a determination that a user's weight threshold exceeds the first weight threshold, a relevance score of between 0 and 1 may be added to a user profile associated with the user. A relevance score of 1 may indicate that a category is significantly relevant to the user, while a relevance score of 0 may indicate the category is less relevant to the user. Subsequently, in response to a request of the media item owner to contract (reduce) the population of users that should be provided with the media item, the content sharing platform may select a desired group of users from users with relevance scores of between 0 and 1 (by selecting a group of users with higher relevance scores). In another example, in response to a determination that the user's weight does not satisfy the first weight threshold but does satisfy the second weight threshold, a relevance score of between −1 and 0 may be added to the user profile. Subsequently, in response to a request of the media item owner to expand the population of users that should be provided with the media item, the content sharing platform may select a desired group of users from users with relevance scores of between 0 and −1 (by selecting a group of users with higher (i.e., less negative) relevance scores). In yet another example, in response to a determination that the user's weight does not satisfy either the first weight threshold or the second weight threshold, the user will not be part of the population of users considered either for contraction or expansion. The relevance scores may further be used by the content sharing platform to identify a candidate media item for presentation to a user of the content sharing platform. In response to a request for content from a user, the content sharing platform may identify a set of media items as candidates for presentation to the user. The content sharing platform may identify a relevance score corresponding to a category associated with a candidate media item of the identified set of media items. The candidate media item may be selected for presentation to the user in response to a determination, based on the relevance score for the corresponding category, that the category is relevant to the user. For example, the relevance score corresponding to the category associated with the candidate media item may be approximately 0.9. A relevance score of 0.9 may indicate that the category associated with the candidate media item is significantly relevant to the user. Therefore, the candidate media item may be selected for presentation to the user over other media items of the identified set of media items.

Accordingly, aspects of the present disclosure provide media item providers with a mechanism to simplify the user group selection process, allowing a media item provider to explicitly define desired user categories in a group of users to whom the media item can be provided and a desired size of such a group, and dynamically adjusting (e.g., expanded or contracted) the size of the group according to the media item provider's preference. This prevents a media item provider from guessing which additional categories should be associated with the media item in order to increase the number of users included in the group of users. By preventing the media item provider from guessing which additional categories should be associated with the media item, processing resources are no longer wasted on presenting media items to users of the content sharing platform that are irrelevant to the user, the users' trust and/or interest in the content sharing platform is improved, and the media item is now provided to a desired number of users without presenting the media item to a too large or too small group of users. Further, by determining the weight threshold prior to receiving a request to present the media item to the user, unnecessary processing resources are not utilized to determine whether a user is included in the group of users at the time the request for content is received, thereby reducing system latency in responding to the user request for content. Control over access to data, such as media items, in computer systems can present a significant technical challenge. Aspects of the present disclosure may provide convenient mechanisms to simplify the control over the extent of access to and/or provision of media items.

Further, aspects of the present disclosure reduce overall system latency when a user requests content from the content sharing platform. By generating and adding relevance scores to a user profile prior to receiving a request for content from a user, the content sharing platform may more quickly identify media items for presentation to the user that are relevant to the user, based on the relevance scores, in response to receiving a user request for content. By identifying media items that are relevant to the user, fewer candidate media items are considered by the content sharing platform for presentation to the user. As such, fewer processing resources are utilized in selecting a media item for presentation to a user, thereby reducing overall system latency. In addition, by using the relevance scores, the user group contraction and expansion operations are simplified, thereby requiring fewer processing resources when addressing requests of item media providers.

FIG. 1 illustrates an example system architecture 100, in accordance with implementations of the present disclosure. The system architecture 100 (also referred to as "system" herein) includes client devices 102A-N, a data store 110, a content sharing platform 120, one or more server machines 130-140, and a third party platform 165, each connected to a network 104.

In implementations, network 104 may include a public network (e.g., the Internet), a private network (e.g., a local area network (LAN) or wide area network (WAN)), a wired network (e.g., Ethernet network), a wireless network (e.g., an 802.11 network or a Wi-Fi network), a cellular network (e.g., a Long Term Evolution (LTE) network), routers, hubs, switches, server computers, and/or a combination thereof.

The client devices 102A-N may each include computing devices such as personal computers (PCs), laptops, mobile phones, smart phones, tablet computers, netbook computers, network-connected televisions, etc. In some implementations, client devices 102A-N may also be referred to as "user devices." Each client device may include a content viewer. In some implementations, a content viewer may be an application that provides a user interface (UI) for users to view or upload content, such as images, video items, web pages, documents, etc. For example, the content viewer may be a web browser that can access, retrieve, present, and/or navigate content (e.g., web pages such as Hyper Text Markup Language (HTML) pages, digital media items, etc.) served by a web server. The content viewer may render, display, and/or present the content to a user. The content viewer may also include an embedded media player (e.g., a Flash® player or an HTML5 player) that is embedded in a web page (e.g., a web page that may provide information about a product sold by an online merchant). In another example, the content viewer may be a standalone application (e.g., a mobile application or app) that allows users to view digital media items (e.g., digital video items, digital images, electronic books, etc.). According to aspects of the disclosure, the content viewer may be a content sharing platform application for users to record, edit, and/or upload content for sharing on content sharing platform 120. As such, the content viewers may be provided to the client devices 102A-N by content sharing platform 120. For example, the content viewers may be embedded media players that are embedded in web pages provided by the content sharing platform 120.

A media item 121 may be consumed via the Internet or via a mobile device application, such as a content viewer of client device 102A-N. As discussed previously, a requested media item 121 may be requested for presentation to the user by the user of the content sharing platform 120. As used herein, "media," "media item," "online media item," "digital media," "digital media item," "content," and "content item" can include an electronic file that can be executed or loaded using software, firmware or hardware configured to present the digital media item to an entity. In one implementation, the content sharing platform 120 may store the media items 121 using the data store 110. In another implementation, the content sharing platform 120 may store media items 121 or fingerprints as electronic files in one or more formats using data store 110. The media items 121 may be provided to the user, wherein the provision of the media item 121 may comprise one or more of: allowing access to the media item 121, transmitting the media item 121 and/or presenting or permitting presentation of the media item 121.

In one implementation, the media items 121 are video items. A video item is a set of sequential video frames (e.g., image frames) representing a scene in motion. For example, a series of sequential video frames may be captured continuously or later reconstructed to produce animation. Video items may be provided in various formats including, but not limited to, analog, digital, two-dimensional and three-dimensional video. Further, video items may include movies, video clips or any set of animated images to be displayed in sequence. In addition, a video item may be stored as a video file that includes a video component and an audio component. The video component may refer to video data in a video coding format or image coding format (e.g., H.264 (MPEG-4 AVC), H.264 MPEG-4 Part 2, Graphic Interchange Format (GIF), WebP, etc.). The audio component may refer to audio data in an audio coding format (e.g., advanced audio coding (AAC), MP3, etc.). It may be noted GIF may be saved as an image file (e.g., .gif file) or saved as a series of images into an animated GIF (e.g., GIF89a format). It may be noted that H.264 may be a video coding format that is block-oriented motion-compensation-based video compression standard for recording, compression, or distribution of video content, for example.

In some implementations, data store 110 is a persistent storage that is capable of storing media items 121 as well as data structures to tag, organize, and index the media items 121. Data store 110 may be hosted by one or more storage devices, such as main memory, magnetic or optical storage based disks, tapes or hard drives, NAS, SAN, and so forth. In some implementations, data store 110 may be a network-attached file server, while in other embodiments data store 110 may be some other type of persistent storage such as an object-oriented database, a relational database, and so forth, that may be hosted by content sharing platform 120 or one or more different machines coupled to the server content sharing platform 120 via network 104.

In one implementation, content sharing platform 120 or server machines 130-150 may be one or more computing devices (such as a rackmount server, a router computer, a server computer, a personal computer, a mainframe computer, a laptop computer, a tablet computer, a desktop computer, etc.), data stores (e.g., hard disks, memories, databases), networks, software components, and/or hardware components that may be used to provide a user with access to media items 121 and/or provide the media items 121 to the user. For example, content sharing platform 120 may allow a user to consume, upload, search for, approve of ("like"), disapprove of ("dislike"), or comment on media items 121. Content sharing platform 120 may also include a website (e.g., a webpage) or application back-end software that may be used to provide a user with access to the media items 121.

In implementations of the disclosure, a "user" may be represented as a single individual. However, other implementations of the disclosure encompass a "user" being an entity controlled by a set of users and/or an automated source. For example, a set of individual users federated as a community in a social network may be considered a "user". In another example, an automated consumer may be an automated ingestion pipeline, such as a topic channel, of the content sharing platform 120.

Content sharing platform 120 may include multiple channels (e.g., channels A through Z). A channel can include one or more media items 121 available from a common source or media items 121 having a common topic, theme, or substance. Media items 121 can be digital content chosen by a user, digital content made available by a user, digital content uploaded by a user, digital content chosen by a content provider, digital content chosen by a broadcaster, etc. For example, a channel X can include videos Y and Z. A channel can be associated with an owner, who is a user that can perform actions on the channel. Different activities can be associated with the channel based on the owner's actions, such as the owner making digital content available on the channel, the owner selecting (e.g., liking) digital content associated with another channel, the owner commenting on digital content associated with another channel, etc. The activities associated with the channel can be collected into an activity feed for the channel. Users, other than the owner of the channel, can subscribe to one or more channels in which they are interested. The concept of "subscribing" may also be referred to as "liking", "following", "friending", and so on.

Third party platform(s) 165 can be used to provide video advertisements. Alternatively, third party platform(s) 165 can provide other services. For example, third party platform(s) 165 may be a video streaming service provider that produces a media streaming service via a communication application for users to play videos, TV shows, video clips, audio, audio clips, and movies, on client devices 102A-Z via the third party platform(s) 165.

In some implementations, a media item provider may upload or otherwise provide (e.g., via third party platform 165) a media item 121 to content sharing platform 120 for presentation to one or more users. The media item provider may specify a category of a group of users to be provided with media item 121. A category may correspond to one or more statuses (e.g., a parental status, an education status, a relationship status, a property ownership status, etc.) or attributes (e.g., an occupation, an industry associated with the occupation, a size of a company that employs the user, etc.) of a user of content sharing platform 120. A user may belong to a respective category if the user is associated with a status or an attribute corresponding to the category. For example, the media item provider may indicate media item 121 should be provided to parents of infants. As such, users having a status of being a parent of an infant may be provided with media item 121. In another example, the media item provider may indicate media item 121 should be provided to attorneys. As such, users having an attribute of being an attorney may be provided with media item 121.

A user may be determined to be associated with a status or an attribute corresponding to a respective category based on one or more weights associated with the user, where the one or more weights each indicate a probability of the user belonging to the respective category. A user of a content sharing platform 120 may create a user profile and specify certain information in the user profile (e.g., name, email address, occupation, etc.). Content sharing platform 120 may also include, in the user profile, one or more weights each indicating a probability of the user belonging to a respective category. User profiles may further include historical data associated with a respective user. In some implementations, historical data may include data provided by the user (e.g., data provided when a user creates a user profile for content sharing platform 120, data provided by a user in response to questions prompted by content sharing platform 120, etc.). In other or similar implementations, historical data may include data collected as a result of the user interacting with content sharing platform 120. The historical data of the respective user may be used to determine the one or more weights associated with the user.

Server machine 130 may include a category weight generator 132 to generate each weight included in a user profile using a machine learning model trained on historical data of one or more users of content sharing platform 120. In some implementations, historical data for one or more users of content sharing platform 120 may be extracted from respective user profiles and used to generate training data. The training data may include training inputs including attributes of users and target outputs including categories previously assigned to users. As a result of training, the machine learning model may derive dependencies between user attributes and relevant categories, and the trained machine learning model may be subsequently used to provide a weight indicating a probability of correspondence between a new user and a category. For example, historical data associated with a new user of content sharing platform 120 may be obtained from a user profile associated with the new user and provided as input to the trained machine learning model. The trained machine learning model may provide, as an output, one or more weights each indicating a probability of correspondence between the new user and one or more categories. Each user profile of individual users of content sharing platform 120, including the determined weights in association with respective categories, may be stored in data store 110.

In some implementations, a category may have either a first category type or a second category type. The first category type may correspond with a status or attribute to which a user can be associated without conflicting with another status or attribute the user is also associated with. For example, with respect to a parental status of the user, the user may be a parent of an infant and a parent of a toddler simultaneously. As such, the user may belong in a first category of parents of infants and a second group of parents of toddlers. A first category type may include at least a parental status of the user, an occupation of the user, an industry associated with the occupation of the user, or an education status of the user.

The second category type may correspond with a status or attribute to which a user cannot be associated without conflicting with another status or attribute the user is also associated with. For example, with respect to an education status of the user, a highest level of education of a user may either be a bachelor's degree or a doctorate degree. As such, the user may belong in a first category of a highest level of education being a bachelor degree or a second category of a highest level of education being a doctorate degree. The user, however, may not belong in both the first category and the second category. In another example, with respect to a property ownership status of the user, the user may either be a homeowner or a renter, but may not be both a homeowner and a renter. As such, the user may belong in either a first category of homeowners or a second category of renters. The user, however, may not belong in both the first category and the second category.

In some implementations, category weight generator 132 may generate two or more weights that each indicate a probability of a user belonging to a category having a second category type. For example, a first weight may be 0.9, indicating a probability of 90% that a user belongs in a first category of homeowners. A second weight may be 0.85, indicating a probability of 85% that a user belongs in a second category of renters. In such implementations, content sharing platform 120 may determine a category having the second category type (i.e., the first category or the second category) that the user should belong in. Content sharing platform 120 may determine the category the user should belong in based on one or more category rules. In some implementations, the one or more category rules may be defined by an administrator of content sharing platform 120 and may be stored at data store 110. The one or more category rules may provide an indication of a category the user should belong in based on two or more weights that each indicate a probability of the user belonging to categories having a second category type. In accordance with the above example, content sharing platform 120 may determine the user belongs in a group associated with homeowners in view of a category rule that specifies a user is to belong in a category of homeowner in response to a determination that the probability the user is a homeowner exceeds the probability the user is a renter.

In response to determining the category the user should belong in, content sharing platform 120 may provide an indication of the determined category to be included in a user profile for the user. In some implementations, the indication of the determined category may be a pointer to the category having the second category type that the user should belong in. In other or similar implementations, the indication of the determined category may include a re-generated weight for the category the user should not belong in. For example, content sharing platform 120 may re-set the second weight to 0, thereby indicating a probability of 0% that the user belongs in a second category of renters.

In some implementations, content sharing platform 120 may provide the indication of the determined category in response to category weight generator 132 generating the weights of the user profile. In other or similar implementations, content sharing platform 120 may provide the indication of the determined category when evaluating whether to present a media item 121 to the user.

The media item provider may also indicate a desired size of the group of users to be provided with the media item 121 associated with the specific category. Content sharing platform 120 may determine a size of the group of users to be provided with media item 121 based on the desired size indicated by the media item provider. Initially, the size of the group of users for the specific category may be set to a first level. A first level may be represented as a first statistical value that indicates a first quantitative relation between the number of users that belong to the specific category and the entire population of users (e.g., the total number of users of content sharing platform 120). The first statistical value may be an estimated percentage of a population of users, from the entire population of users of content sharing platform 120, that belong to the specific category. For example, a specific category associated with a media item 121 may be parents of infants, and users that belong to this category may correspond to 10% of the entire population of users of content sharing platform 120. As such, the first level may be represented by a first statistical value of 10% for the specific category of parents of infants.

In some implementations, content sharing platform 120 may set a weight threshold for each category. In other or similar implementations, content sharing platform 120 may set an overall weight threshold for all categories. User determination module 142 may use a weight threshold to determine whether to include a user in a group of users to whom a media item 121 associated with a particular category should be provided. This may be achieved by comparing a corresponding weight of the user with a weight threshold associated with the relevant category. If the corresponding weight meets or exceeds the weight threshold associated with the relevant category, the user may be considered to belong to that category and may be included in the group of users to whom the media item 121 should be provided.

Depending on the weight threshold associated with a specific category, the size of the group of users (or the size of the appropriate audience) to be provided with a media item 121 of the specific category may vary. For example, if a first weight threshold is set to 0.9 and a second weight threshold is set to 0.8, the number of users having respective weights that meet or exceed the first threshold would be lower than the number of users having respective weights that meet or exceed the second threshold.

According to some aspects of the present disclosure, for a specific category, the user group size at the first (initial) level is associated with a first (initial) weight threshold, which can be user defined or determined by the content sharing platform 120 (e.g., by selecting a threshold that is likely to produce a percentage of user population that matches the first level for the specific category). In accordance with the previous examples, the first level may by represented by 10% (i.e., 10% of the entire population of users of the content sharing platform 120 may be estimated to be parents of infants). A weight threshold that can result in 10% of users to be considered as parents of infants may be set to 85%. In some implementations, content sharing platform 120 determines the weight threshold by (i) identifying users Ux with weight w associated with the category of parents of infants, (ii) determining number n of users that constitutes 10% of the total population of users of the content sharing platform 120, (iii) selecting a cutoff value t, which when compared with weight w of each user Ux, would result in n number of users Ux having weight w that exceeds (or is equal to) cutoff value t, and (iv) setting the first threshold to t. In other or similar implementations, the weight threshold may be determined by a threshold calculation component 144 of a group size adjustment module 142 of server machine 140.

As discussed above, a media item provider may request that the size of the group of users to be provided with a media item 121 be changed from the first level to a second level. Server machine 140 may include a group size adjustment module 142 to facilitate changing the size of the group of users from the first level to the second level. The second level may represent a second statistical value that indicates a second quantitative relation between a number of users in the group and the total number of users of content sharing platform 120. The second level may correspond with a population of users that is expanded or contracted from the original population of users of the first level. For example, the media item provider may request that the size of the group of users to be provided with the media item 121 be doubled (i.e., increased by 100%).

In some implementations, the media item provider may specify the value (e.g., 100%) indicating the difference between the first level and the second level. Alternatively, the media item provider may merely specify a particular level that should result from the change (e.g., by setting the new level from level 1 to level 2), and group size adjustment module 142 may determine a second statistical value that indicates a second quantitative relation between a number of users in the group and an entire population of users. The value indicating the difference between the first level and the second level may be determined in view of a difference between the first statistical value and the second statistical value.

The size of the group at the second level may be determined based on a population of users of the content sharing platform 120 that satisfy a second weight threshold for the group of users, where the second weight threshold corresponds to the second level. The second weight threshold may be calculated based on the value indicating the difference between the first level and the second level. In accordance with the previous examples, the second level may correspond with a population of users that is expanded approximately by 100% from the original population of users that belong to the specific category of parents of infants (i.e., 10% of the entire population of users), and the requested increase by 100% would result in 20% of users to be considered as belonging to the specific category of parents of infants (i.e., from the original 10% of the entire population of users).

Group size adjustment module 142 may include a threshold calculation component 144. In some implementations, threshold calculation component 144 calculates the second weight threshold by (i) identifying users Ux with weight w associated with the category of parents of infants, (ii) determining number m of users that constitutes 20% (statistical value of the second level) of the total population of users of the content sharing platform 120, (iii) selecting a cutoff value t2, which when compared with weight w of each user Ux, would result in m number of users Ux having weight w that exceeds (or is equal to) cutoff value t2, and (iv) setting the second threshold to t2. In response to determining that the weight assigned to user A satisfies the second weight threshold for the category of parents of infants (i.e., 0.7), user A may be determined to be included in the population of users corresponding to the category of parents of infants, even though user A would not satisfy the first weight threshold.

In some implementations, a relevance score generator 134 may further generate a relevance score to be included in a user profile of a user. The relevance score may correspond to a weight associated with a category included in the user profile. In some implementations, the relevance score may replace a weight associated with a category included in the user profile.

The relevance score may be generated based on a determination of whether a user's weight satisfies the first weight threshold and/or the second weight threshold, with respect to that category. For example, in response to a determination that a user's weight threshold exceeds the first weight threshold, a relevance score of between 0 and 1 may be added to a user profile associated with the user. A relevance score of 1 may indicate that a category is significantly relevant to the user, while a relevance score of 0 may indicate the category is less relevant to the user. Subsequently, in response to a request of the media item owner to contract (reduce) the population of users that should be provided with the media item, the content sharing platform may select a desired group of users from users with relevance scores of between 0 and 1 (by selecting a group of users with higher relevance scores). In another example, in response to a determination that the user's weight does not satisfy the first weight threshold but does satisfy the second weight threshold, a relevance score of between −1 and 0 may be added to the user profile. A relevance score of between −1 and 0 may indicate that a user is only to be provided with a media item 121 associated with a corresponding category if the media item provider has requested to increase a size of a group of users to be provided with the media item 121 from a first level to a second level. That is, in response to a request of the media item owner to expand the population of users that should be provided with the media item, the content sharing platform may select a desired group of users from users with relevance scores between −1 and 0 (by selecting a group of users with higher (i.e., less negative) relevance scores). In another example, in response to a determination that the user's weight does not satisfy the first weight threshold or the second weight threshold, the user may not be part of the population of users considered either for contraction or expansion.

The relevance scores may further be used by content sharing platform 120 to identify a candidate media item for presentation to a user of content sharing platform 120. A user may request, via a client device 102A-N, content from content sharing platform 120. In response to receiving the user request, content sharing platform 120 may identify a set of media items 121 as candidates for presentation to the user. In one example, each media item 121 of the set of media items may be provided to content sharing platform 120 by a separate media item provider.

Content sharing platform 120 may identify a candidate media item 121 from the set of media items. In some implementations, a media item provider of the candidate media item 121 may have requested to change a size of the population of users that should be provided with the media item from a first level to a second level. For example, the media item provider may have requested to enlarge (increase) the population of users or contract (reduce) the group of users.

Content sharing platform 120 may identify a relevance score corresponding to a category associated with the candidate media item 121 from a user profile of the user. Content sharing platform 120 may determine whether to select the candidate media item 121 for presentation to the user based on the identified relevance score. For example, the relevance score corresponding to the category associated with the candidate media item 121 may be approximately 0.9. A relevance score of 0.9 may indicate that the category associated with the candidate media item 121 is significantly relevant to the user. Therefore, the candidate media item 121 may be selected for presentation to the user over other media items 121 of the identified set of media items.

In another example, the relevance score corresponding to the category associated with the candidate media item 121 may be approximately −0.2. A relevance score of −0.2 may indicate that the category associated with the candidate media item 121 is only relevant to the user if the media item provider has provided an request to expand the population of users to be provided with the candidate media item 121. As the user has a relevance score of −0.2, the user may be included in a desired group of users having relevance scores between 0 and −1. Therefore, the candidate media item 121 may be selected for presentation to the user over other media items 121 of the set of media items in response to a determination that the media item provider has requested to expand the population of users.

In another example, the relevance score corresponding to the category associated with the candidate media item may be approximately 0.2. As discussed above, the media item provider may have requested to reduce the population of users to be provided with the media item 121. Although the user may have a relevance score exceeding 0 (thus indicating that the category may be relevant to the user), the user may not be included in a desired group of users having higher relevance scores that should be provided with the media item 121. As such, the media item 121 may not be selected to be provided to the user.

Figure 2:
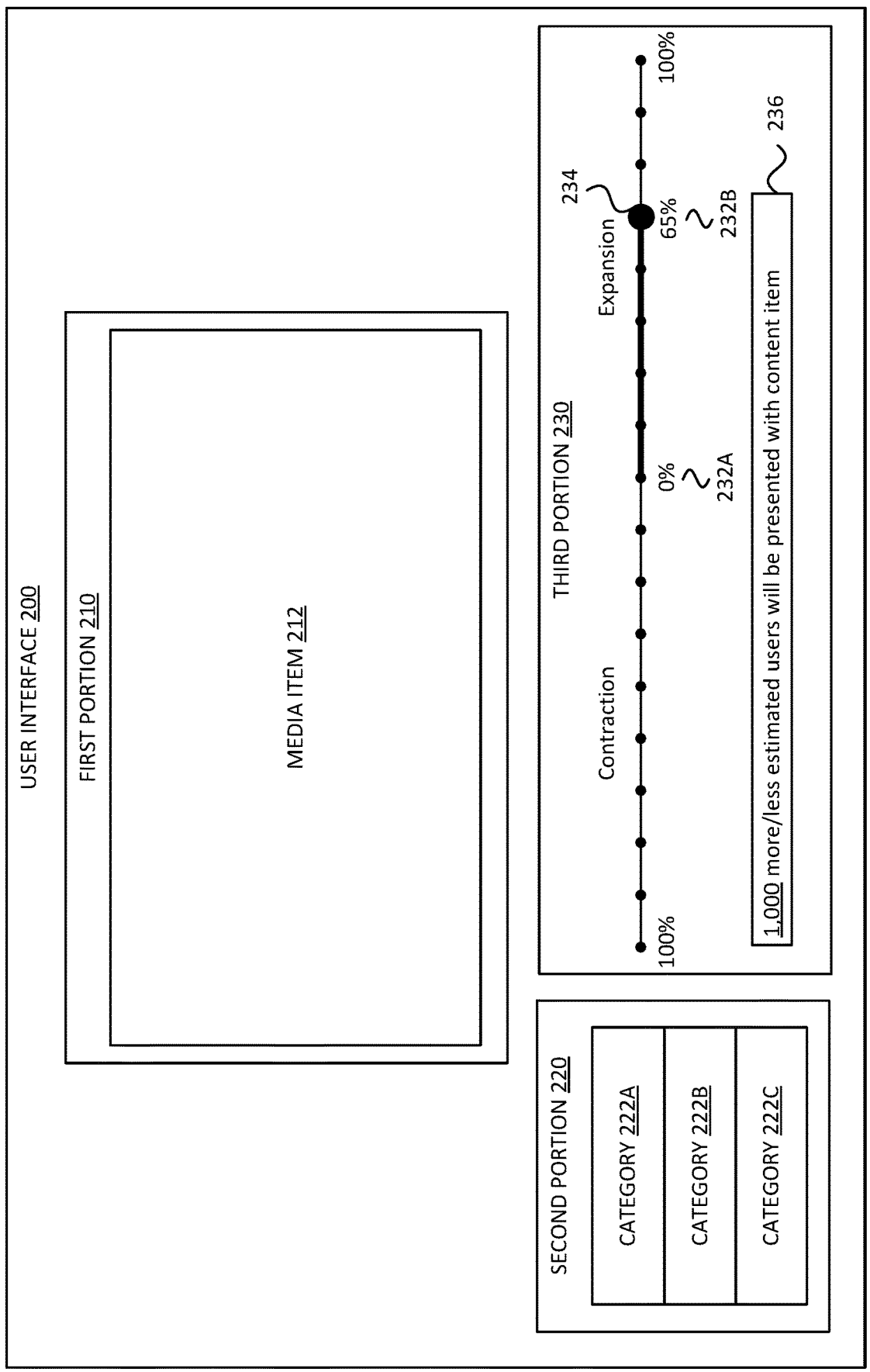
FIG. 2 illustrates a user interface facilitating changing a size of a group of first users from a first level to a second level, in accordance with some aspects of the present disclosure.

FIG. 2 illustrates a user interface 200 facilitating changing a size of a group of first users from a first level to a second level, in accordance with some aspects of the present disclosure. User interface 200 may include at least a first portion 210, a second portion 220, and a third portion 230. First portion 210 may include a media item 212 provided to a content sharing platform (e.g., content sharing platform 120 of FIG. 1) by a media item provider. First portion 210 may include one or more first UI components (not shown) that allow a user to upload or otherwise provide the media item 212 to the content sharing platform. First portion 210 may also include a media player that can play the media item for the user.

Second portion 220 may include one or more second UI components that allow a user to provide one or more categories 222A-C to be associated with media item 212. In some implementations, the second UI components may allow a user to select a category (e.g., category 222A) to be associated with media item 212 from one or more categories (e.g., categories 222A-C) allowed by the content sharing platform. In some implementations, the category 222A-C may include at least one of a parental status of the user, an occupation of the user, an industry associated with the occupation of the user, a size of a company that employs the user, an education status of the user, a relationship status of the user, or a property ownership status of the user.

Third portion 230 may include one or more third UI components that allow a user to change a size of a group of second users to be provided with media item 212 from a first level to a second level. In accordance with previously discussed embodiments, the first level may represent a first statistical value that indicates a first quantitative relation between a number of users in the group of users and a total number of users of the content sharing platform. The second level may represent a second statistical value that indicates a second quantitative relation between a number of users in the group of users and the total number of users of the content sharing platform. In some implementations, the one or more third UI components may include two or more level markers 232A, B and a slider component 234. A first level marker 232A may correspond to the first level of the size of the group of users and the second level marker 232B may correspond to the second level of the size of the group of users. A user may request to change the size of the group of second users from the first level to the second level by moving the slider component 234 from the first level marker 232A to the second level marker 232B.

In some implementations, the second level marker 232B may provide a value indicating the difference between the first level and the second level (e.g., 65% increase). In other or similar implementations, the second level marker 232B may provide a level indicator (e.g., L3) for the desired level of the group size. The value indicating the difference between the first level and the second level may be determined based on the level indicator in accordance with previously described embodiments.

Third portion 230 may further display an indication 236 of the number of second users of the content sharing platform to be included in the group of second users as a result of changing the size of the group of second users from the first level to the second user. In some implementations, the indication 236 of the number of second users may be provided in a fourth portion (not shown) of user interface 200.

Although the above description includes references to certain user interface elements included in either the first portion 210, the second portion 220, the third portion 230, or the fourth portion (not shown) of user interface 200, it is to be understood that such references are provided for the purpose of explanation and are not considered to be limiting. Any of the above described user interface elements may be any one of a variety of user interface elements including, but not limited to, a text field, a drop down list, a check box, etc.

Figure 3:
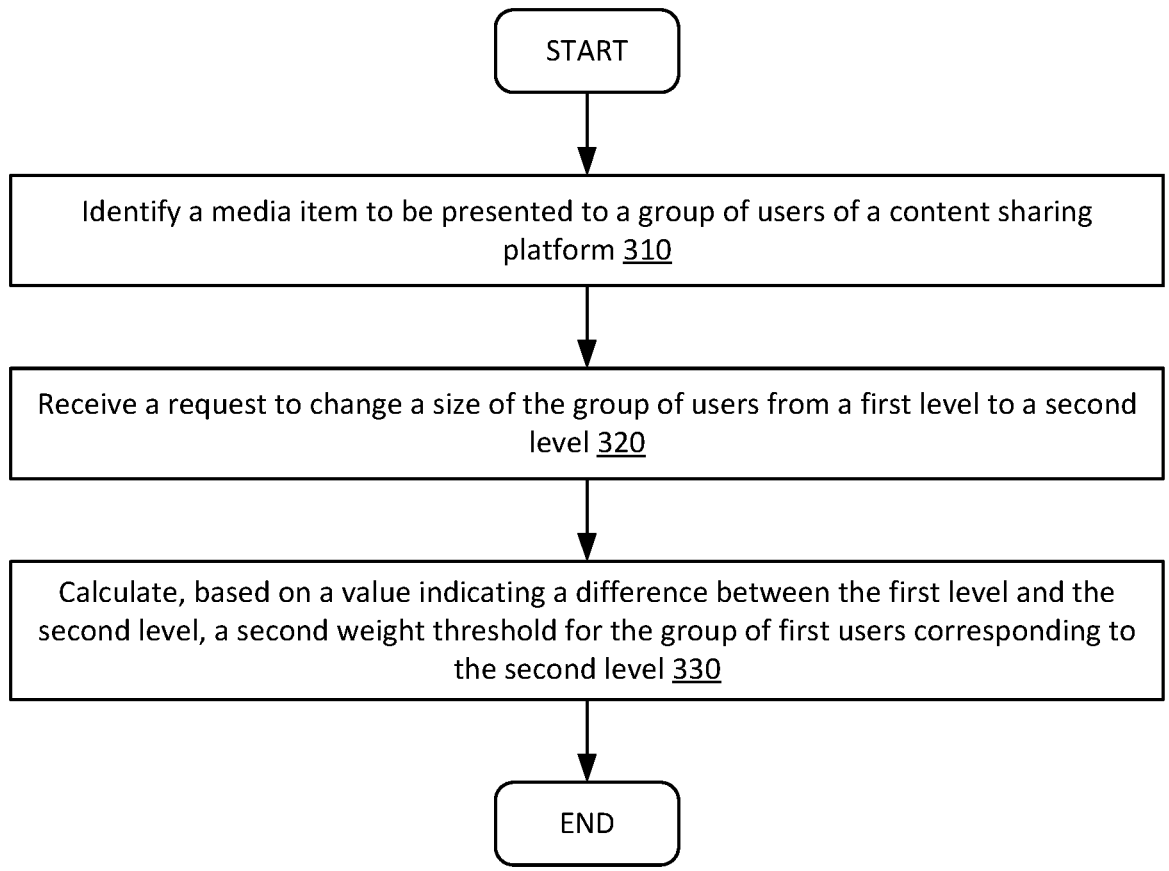
FIG. 3 illustrates a flow diagram for an example method for changing a size of a group of users from a first level to a second level, in accordance with some aspects of the present disclosure.
Figure 4:
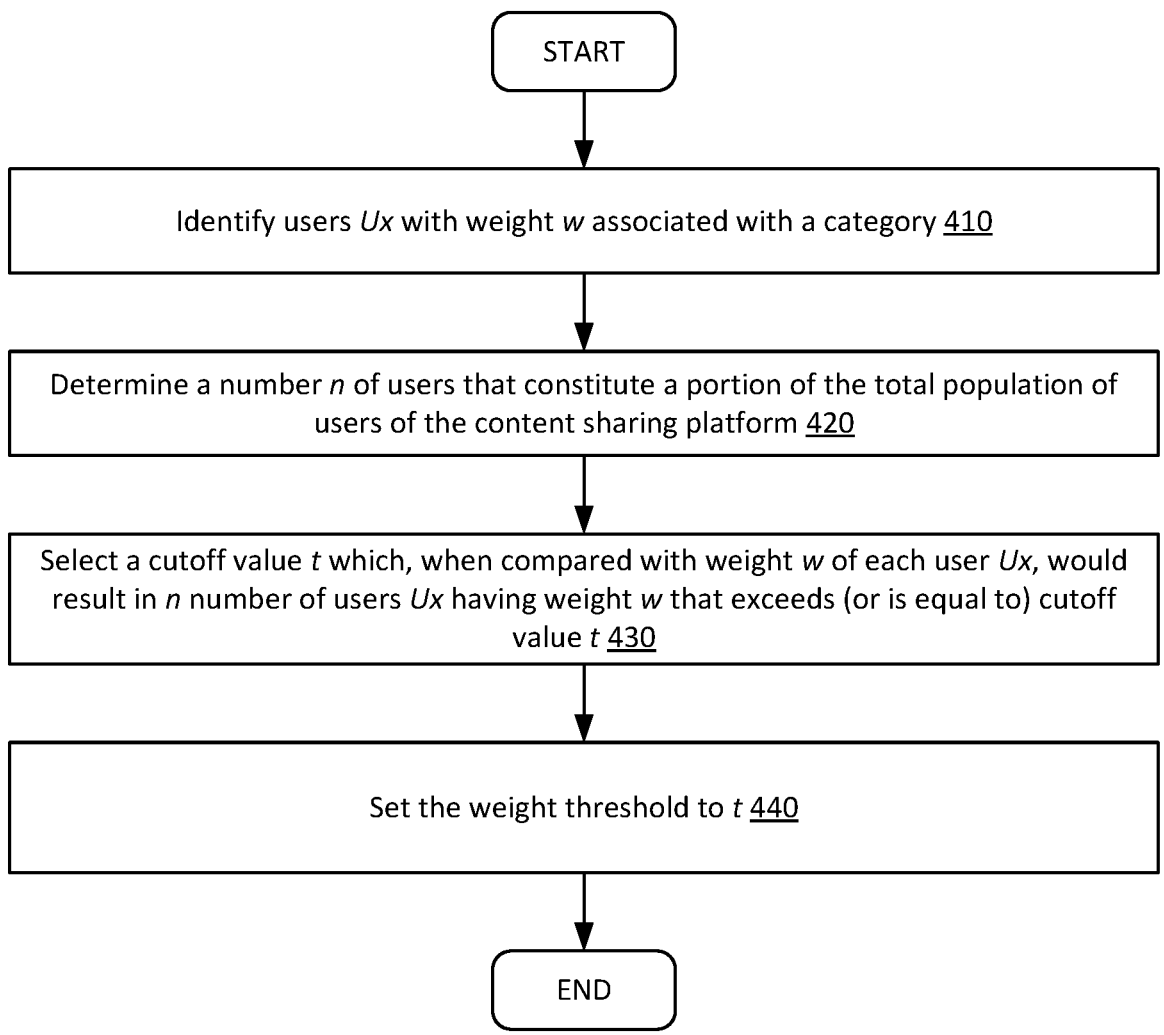
FIG. 4 illustrates a flow diagram for an example method for calculating a weight threshold for a group of users corresponding to a second level, in accordance with some aspects of the present disclosure.
Figure 5:
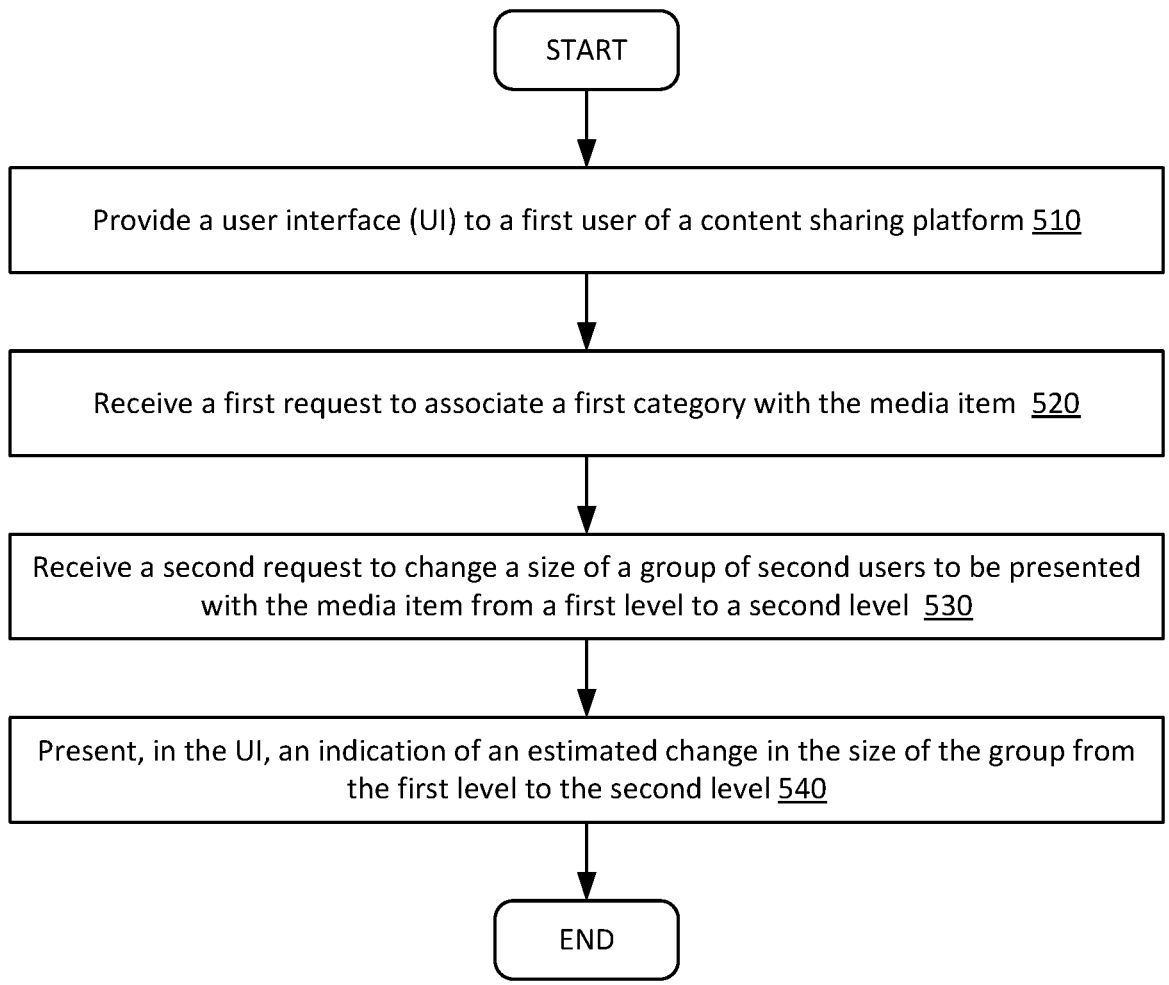
FIG. 5 illustrates a flow diagram for an example method for providing a user interface to a user of a content sharing platform, the user interface to facilitate changing a size of a group of users from a first level to a second level, in accordance with some aspects of the present disclosure.

FIG. 3 depicts a flow diagram of a method 300 for changing a size of a group of users from a first level to a second level, in accordance with some aspects of the present disclosure. FIG. 4 illustrates a flow diagram for an example method 400 for calculating a weight threshold for a group of users corresponding to the second level, in accordance with some aspects of the present disclosure. FIG. 5 depicts a flow diagram of a method 500 for providing a user interface to a user of a content sharing platform, the user interface to facilitate changing a size of a group of users from a first level to a second level, in accordance with some aspects of the present disclosure. Methods 300, 400 and 500 may be performed by processing logic that may include hardware (circuitry, dedicated logic, etc.), software (e.g., instructions run on a processing device), or a combination thereof. In one implementation, some or all the operations of methods 300, 400 and 500 may be performed by one or more components of system 100 of FIG. 1.

Referring now to FIG. 3, at block 310, processing logic may identify a media item to be provided to a group of users of a content sharing platform. The media item may be associated with a category. The category may be provided by a provider of the media item, in accordance with previously described embodiments. Each user of the group of users may be associated with a weight indicating a probability of a correspondence between a respective user and the category associated with the media item. In some implementations, the category may include at least one of a parental status of the user, an occupation of the user, an industry associated with the occupation of the user, a size of a company that employs the user, an education status of the user, a relationship status of the user, or a property ownership status of the user.

At block 320, processing logic may receive a request to change a size of the group of users from a first level to a second level. The first level may correspond to a first weight threshold for the group of users. In some implementations, the first weight threshold may be determined in accordance with method 400 of FIG. 4. The first level may represent a first statistical value that indicates a first quantitative relation between a number of users in the group and a total number of users of the content sharing platform. The second level may represent a second statistical value that indicates a second quantitative relation between a number of users in the group and the total number of users of the content sharing platform.

At block 330, processing logic may calculate, based on a value indicating a difference between the first level and the second level, a second weight threshold for the group of first users corresponding to the second level. In some implementations, the value indicating the difference between the first level and the second level may be specified by the provider of the media item and is a difference between the first statistical value represented by the first level and the second statistical value represented by the second level. In other or similar implementations, the processing logic may determine the value indicating the difference between the first level and the second level by receiving input of a provider of the media item, where the received input specifies the second level, identifying one or more rules pertaining to the category associated with the media item, determining, based on the one or more rules, the second statistical value, and determining a difference between the first statistical value and the second statistical value. In some implementations, the second weight threshold may be determined in accordance with method 400 of FIG. 4.

The processing logic may use the second weight threshold to determine whether a user requesting content from the content sharing platform is to be provided with a specific media item. A weight associated with the requesting user for the category of the media item may be identified from a user profile associated with the user. The processing logic may compare the weight associated with the requesting user for the category of the media item with the second weight threshold to determine whether the media item is to be provided to the requesting user.

As discussed above, FIG. 4 depicts a flow diagram of a method 400 for calculating a weight threshold for a group of users corresponding to a second level, in accordance with some aspects of the present disclosure. At block 410, processing logic may identify users Ux with weight w associated with a category. At block 420, processing logic may determine a number of n users that constitute a portion of the total population of users of the content sharing platform. At block 430, processing logic may select a cutoff value t which, when compared with weight w of each user Ux, would result in n number of users Ux having weight w that exceeds (or is equal to) cutoff value t. At block 440, the threshold weight is set to t.

In some implementations, method 400 may be performed to determine either a first threshold corresponding to a first level of a size of a group of users or a second threshold corresponding to a second level of a size of a group of users, in accordance with previously described embodiments.

As discussed above, FIG. 5 depicts a flow diagram of a method 500 for providing, to a user of a content sharing platform, a user interface that facilitates changing a size of a group of users from a first level to a second level, in accordance with some aspects of the present disclosure. At block 510, processing logic may provide a user interface (UI) to a first user (e.g., a provider of a media item) of a content sharing platform. The UI may include at least a first portion and a second portion. The first portion may include one or more first UI components that allow the first user to provide one or more categories associated with the media item. The one or more first UI components may be configured to display, via the UI, one or more categories to be selected by the first user for association with the media item. In some implementations, the one or more categories may include at least one of a parental status of a second user (e.g., an end user of the content sharing platform), an occupation of the second user, an industry associated with the occupation of the second user, a size of a company that employs the second user, an education status of the second user, a relationship status of the second user, or a property ownership status of the second user.

The second portion may include one or more second UI components that allow the first user to change a size of a group of second users to be provided with the media item. The size of the group of second users may be based on a first weight threshold indicating a probability of a correspondence between a respective user and the one or more categories associated with the media item. The one or more second UI components may include at least two or more level markers and a slider component. The first level marker may correspond to the first level and a second level marker may correspond to the second level. The first user may request to change the size of the group of second users from the first level to the second level by moving the slider component from the first level marker to the second level marker. In some implementations, the second level marker may include the value indicating the difference between the first level and the second level.

At block 520, processing logic may receive a first request to associate a first category with the media item. At block 530, processing logic may receive a second request to change a size of a group of second users to be provided with the media item from a first level to a second level. At block 540, processing logic may present, in the UI, an indication of an estimated change in the size of the group of second users from the first level to the second level.

Figure 6:
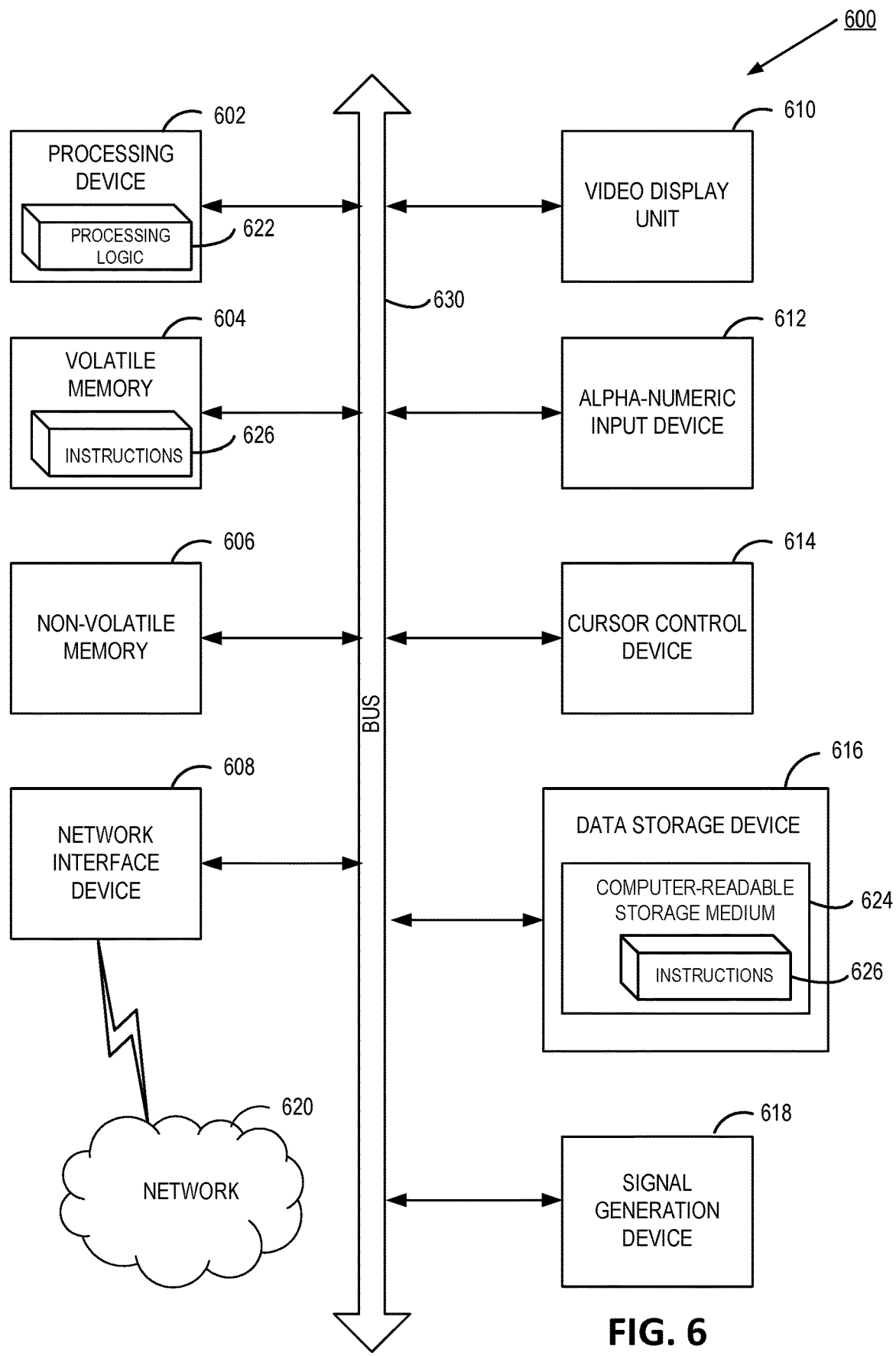
FIG. 6 is a block diagram illustrating an exemplary computer system, in accordance with implementations of the present disclosure.

FIG. 6 is a block diagram illustrating an exemplary computer system, in accordance with implementations of the present disclosure. The computer system 600 can be the server machine 130-140 or client devices 102A-N in FIG. 1. The machine can operate in the capacity of a server or an endpoint machine in endpoint-server network environment, or as a peer machine in a peer-to-peer (or distributed) network environment. The machine can be a television, a personal computer (PC), a tablet PC, a set-top box (STB), a Personal Digital Assistant (PDA), a cellular telephone, a web appliance, a server, a network router, switch or bridge, or any machine capable of executing a set of instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein.

The example computer system 600 includes a processing device (processor) 602, a main memory 604 (e.g., read-only memory (ROM), flash memory, dynamic random access memory (DRAM) such as synchronous DRAM (SDRAM), double data rate (DDR SDRAM), or DRAM (RDRAM), etc.), a static memory 606 (e.g., flash memory, static random access memory (SRAM), etc.), and a data storage device 618, which communicate with each other via a bus 640.

Processor (processing device) 602 represents one or more general-purpose processing devices such as a microprocessor, central processing unit, or the like. More particularly, the processor 602 can be a complex instruction set computing (CISC) microprocessor, reduced instruction set computing (RISC) microprocessor, very long instruction word (VLIW) microprocessor, or a processor implementing other instruction sets or processors implementing a combination of instruction sets. The processor 602 can also be one or more special-purpose processing devices such as an application specific integrated circuit (ASIC), a field programmable gate array (FPGA), a digital signal processor (DSP), network processor, or the like. The processor 602 is configured to execute instructions 605 (e.g., for predicting channel lineup viewership) for performing the operations discussed herein.

The computer system 600 can further include a network interface device 608. The computer system 600 also can include a video display unit 610 (e.g., a liquid crystal display (LCD) or a cathode ray tube (CRT)), an input device 612 (e.g., a keyboard, and alphanumeric keyboard, a motion sensing input device, touch screen), a cursor control device 614 (e.g., a mouse), and a signal generation device 620 (e.g., a speaker).

The data storage device 618 can include a non-transitory machine-readable storage medium 624 (also computer-readable storage medium) on which is stored one or more sets of instructions 605 (e.g., for predicting channel lineup viewership) embodying any one or more of the methodologies or functions described herein. The instructions can also reside, completely or at least partially, within the main memory 604 and/or within the processor 602 during execution thereof by the computer system 600, the main memory 604 and the processor 602 also constituting machine-readable storage media. The instructions can further be transmitted or received over a network 630 via the network interface device 608.

In one implementation, the instructions 605 include instructions for predicting channel lineup viewership. While the computer-readable storage medium 624 (machine-readable storage medium) is shown in an exemplary implementation to be a single medium, the terms "computer-readable storage medium" and "machine-readable storage medium" should be taken to include a single medium or multiple media (e.g., a centralized or distributed database, and/or associated caches and servers) that store the one or more sets of instructions. The terms "computer-readable storage medium" and "machine-readable storage medium" shall also be taken to include any medium that is capable of storing, encoding or carrying a set of instructions for execution by the machine and that cause the machine to perform any one or more of the methodologies of the present disclosure. The terms "computer-readable storage medium" and "machine-readable storage medium" shall accordingly be taken to include, but not be limited to, solid-state memories, optical media, and magnetic media.

Reference throughout this specification to "one implementation," or "an implementation," means that a particular feature, structure, or characteristic described in connection with the implementation is included in at least one implementation. Thus, the appearances of the phrase "in one implementation," or "in an implementation," in various places throughout this specification can, but are not necessarily, referring to the same implementation, depending on the circumstances. Furthermore, the particular features, structures, or characteristics may be combined in any suitable manner in one or more implementations.

To the extent that the terms "includes," "including," "has," "contains," variants thereof, and other similar words are used in either the detailed description or the claims, these terms are intended to be inclusive in a manner similar to the term "comprising" as an open transition word without precluding any additional or other elements.

As used in this application, the terms "component," "module," "system," or the like are generally intended to refer to a computer-related entity, either hardware (e.g., a circuit), software, a combination of hardware and software, or an entity related to an operational machine with one or more specific functionalities. For example, a component may be, but is not limited to being, a process running on a processor (e.g., digital signal processor), a processor, an object, an executable, a thread of execution, a program, and/or a computer. By way of illustration, both an application running on a controller and the controller can be a component. One or more components may reside within a process and/or thread of execution and a component may be localized on one computer and/or distributed between two or more computers. Further, a "device" can come in the form of specially designed hardware; generalized hardware made specialized by the execution of software thereon that enables hardware to perform specific functions (e.g., generating interest points and/or descriptors); software on a computer readable medium; or a combination thereof.

The aforementioned systems, circuits, modules, and so on have been described with respect to interact between several components and/or blocks. It can be appreciated that such systems, circuits, components, blocks, and so forth can include those components or specified sub-components, some of the specified components or sub-components, and/ or additional components, and according to various permutations and combinations of the foregoing. Sub-components can also be implemented as components communicatively coupled to other components rather than included within parent components (hierarchical). Additionally, it should be noted that one or more components may be combined into a single component providing aggregate functionality or divided into several separate sub-components, and any one or more middle layers, such as a management layer, may be provided to communicatively couple to such sub-components in order to provide integrated functionality. Any components described herein may also interact with one or more other components not specifically described herein but known by those of skill in the art.

Moreover, the words "example" or "exemplary" are used herein to mean serving as an example, instance, or illustration. Any aspect or design described herein as "exemplary" is not necessarily to be construed as preferred or advantageous over other aspects or designs. Rather, use of the words "example" or "exemplary" is intended to present concepts in a concrete fashion. As used in this application, the term "or" is intended to mean an inclusive "or" rather than an exclusive "or." That is, unless specified otherwise, or clear from context, "X employs A or B" is intended to mean any of the natural inclusive permutations. That is, if X employs A; X employs B; or X employs both A and B, then "X employs A or B" is satisfied under any of the foregoing instances. In addition, the articles "a" and "an" as used in this application and the appended claims should generally be construed to mean "one or more" unless specified otherwise or clear from context to be directed to a singular form.

Finally, implementations described herein include collection of data describing a user and/or activities of a user. In one implementation, such data is only collected upon the user providing consent to the collection of this data. In some implementations, a user is prompted to explicitly allow data collection. Further, the user may opt-in or opt-out of participating in such data collection activities. In one implementation, the collect data is anonymized prior to performing any analysis to obtain any statistical patterns so that the identity of the user cannot be determined from the collected data.

What is claimed is:

1. A method comprising:
    identifying, by a set of one or more processing devices, a media item to be provided to a group of users of a content sharing platform, wherein the media item is associated with a category, and wherein each user in the group of users is associated with a weight indicating a probability of a correspondence between a respective user and the category associated with the media item;
    receiving, by the set of one or more processing devices, an indication of a user interaction with a user interface (UI) component of a UI, the indication corresponding to a request to change a size of the group of users from a first level, corresponding to a first weight threshold for the group of users, to a second level, wherein the UI component enables a provider of the media item to specify a degree of the change of the size of the group of users between the first level and the second level;
    calculating, by the set of one or more processing devices and based on a value indicating a difference between the first level and the second level, a second weight threshold for the group of users corresponding to the second level; and
    determining one or more respective users for inclusion in the group of users for presentation of the media item based on the calculated second weight threshold for the group of users.

2. The method of claim 1, wherein the first level represents a first statistical value that indicates a first quantitative relation between a number of users in the group and a total number of users of the content sharing platform, and the second level represents a second statistical value that indicates a second quantitative relation between a number of users in the group and the total number of users of the content sharing platform.

3. The method of claim 2, wherein the value indicating the difference between the first level and the second level is specified by a provider of the media item and is a difference between the first statistical value and the second statistical value.

4. The method of claim 2, further comprising determining the value indicating the difference between the first level and the second level, wherein determining the value comprises:
    receiving input of a provider of the media item, the received input specifying the second level;
    identifying one or more rules pertaining to the category associated with the media item; determining, based on the one or more rules, the second statistical value; and
    determining a difference between the first statistical value and the second statistical value.

5. The method of claim 1, further comprising:
comparing a weight associated with the one or more respective users for the category of the media item with the second threshold to determine whether the media item is to be provided to the one or more respective users.

6. The method of claim 1, wherein UI component is a slider component.

7. The method of claim 1, wherein the category comprises at least one of: a parental status of the user, an occupation of the user, an industry associated with the occupation of the user, a size of a company that employs the user, an education status of the user, a relationship status of the user, or a property ownership status of the user.

8. The method of claim 1, wherein the one or more respective users for inclusion in the group of users for presentation of the media item is received responsive to receiving a request for access to media content of the content sharing platform from a client device associated with the one or more respective users.

9. The method of claim 1, further comprising:
updating the UI to indicate a size of the group of users for presentation of the media item in view of the calculated second weight threshold.

10. A non-transitory computer readable storage medium comprising instructions for a server that, when executed by a set of one or more processing devices, cause the set of one or more processing devices to:
identify, by the set of one or more processing devices, a media item to be provided to a group of users of a content sharing platform, wherein the media item is associated with a category, and wherein each user in the group of users is associated with a weight indicating a probability of a correspondence between a respective user and the category associated with the media item;
receive, by the set of one or more processing devices, an indication of a user interaction with a user interface (UI) component of a UI, the interaction corresponding to a request to change a size of the group of users from a first level, corresponding to a first weight threshold for the group of users, to a second level, wherein the UI component enables a provider of the media item to specify a degree of the change of the size of the group of users between the first level and the second level;
calculate, by the set of one or more processing devices and based a value indicating a difference between the first level and the second level, a second weight threshold for the group of users corresponding to the second level; and
determine one or more respective users for inclusion in the group of users for presentation of the media item based on the calculated second weight threshold for the group of users.

11. The non-transitory computer readable storage medium of claim 10, wherein the first level represents a first statistical value that indicates a first quantitative relation between a number of users in the group and a total number of users of the content sharing platform, and the second level represents a second statistical value that indicates a second quantitative relation between a number of users in the group and the total number of users of the content sharing platform.

12. The non-transitory computer readable storage medium of claim 11, wherein the value indicating the difference between the first level and the second level is specified by a provider of the media item and is a difference between the first statistical value and the second statistical value.

13. The non-transitory computer readable storage medium of claim 11, wherein the processing device is to further determine the value indicating the difference between the first level and the second level, wherein determining the value comprises:
receiving input of a provider of the media item, the received input specifying the second level;
identifying one or more rules pertaining to the category associated with the media item; determining, based on the one or more rules, the second statistical value; and
determining a difference between the first statistical value and the second statistical value.

14. The non-transitory computer readable storage medium of claim 10, wherein the processing device is to further:
compare a weight associated with the one or more respective users for the category of the media item with the second threshold to determine whether the media item is to be provided to the one or more respective users.

15. The non-transitory computer readable storage medium of claim 10, wherein the UI component is a slider component.

16. The non-transitory computer readable storage medium of claim 10, wherein the category comprises at least one of: a parental status of the user, an occupation of the user, an industry associated with the occupation of the user, a size of a company that employs the user, an education status of the user, a relationship status of the user, or a property ownership status of the user.

17. A system comprising:
a memory; and
a set of one or more processing devices connected to the memory, wherein the set of one or more processing devices is to perform operations comprising:
identifying a media item to be provided to a group of users of a content sharing platform, wherein the media item is associated with a category, and wherein each user in the group of users is associated with a weight indicating a probability of a correspondence between a respective user and the category associated with the media item;
receiving an indication of a user interaction with a user interface (UI) component of a UI, the indication corresponding to a request to change a size of the group of users from a first level, corresponding to a first weight threshold for the group of users, to a second level, wherein the UI component enables a provider of the media item to specify a degree of the change of the size of the group of users between the first level and the second level;
calculating, and based on a value indicating a difference between the first level and the second level, a second weight threshold for the group of users corresponding to the second level; and
determining one or more respective users for inclusion in the group of users for presentation of the media item based on the calculated second weight threshold for the group of users.

18. The system of claim 17, wherein the first level represents a first statistical value that indicates a first quantitative relation between a number of users in the group and a total number of users of the content sharing platform, and the second level represents a second statistical value that indicates a second quantitative relation between a number of users in the group and the total number of users of the content sharing platform.

19. The system of claim 18, wherein the value indicating the difference between the first level and the second level is specified by a provider of the media item and is a difference between the first statistical value and the second statistical value.

20. The system of claim 18, wherein the operations further comprise determining the value indicating the difference between the first level and the second level, wherein determining the value comprises:

receiving input of a provider of the media item, the received input specifying the second level;

identifying one or more rules pertaining to the category associated with the media item; determining, based on the one or more rules, the second statistical value; and determining a difference between the first statistical value and the second statistical value.

* * * * *